(12) United States Patent
Barberis

(10) Patent No.: US 7,226,135 B2
(45) Date of Patent: Jun. 5, 2007

(54) BRAKING SYSTEM FOR A SELF-POWERED RAIL VEHICLE PROVIDED WITH AN ANTI-SLIP DEVICE

(75) Inventor: Dario Barberis, Turin (IT)

(73) Assignee: Faiveley Transport Piossasco S.p.A., Piossasco (Turin) (IT)

( * ) Notice: Subject to any disclaimer, the term of this patent is extended or adjusted under 35 U.S.C. 154(b) by 143 days.

(21) Appl. No.: 11/019,292

(22) Filed: Dec. 23, 2004

(65) Prior Publication Data
US 2005/0162003 A1 Jul. 28, 2005

(30) Foreign Application Priority Data
Dec. 24, 2003 (IT) .......................... TO2003A1044

(51) Int. Cl.
*B60T 13/70* (2006.01)
(52) U.S. Cl. ............................... 303/15; 303/7; 303/20
(58) Field of Classification Search .................... 303/3, 303/7, 9, 9.61, 15, 16, 17, 20, 28, 29
See application file for complete search history.

(56) References Cited
U.S. PATENT DOCUMENTS
4,598,953 A 7/1986 Mazur et al.
4,671,578 A * 6/1987 Rothen et al. ................. 303/15
6,264,289 B1 * 7/2001 Franke et al. .................. 303/20

FOREIGN PATENT DOCUMENTS
| DE | 195 10 755 | 10/1996 |
| DE | 19510 755 A | 10/1996 |
| DE | 19537622 A1 * | 4/1997 |
| EP | 0 958 980 | 11/1999 |
| EP | 0 958 980 A | 11/1999 |
| EP | 0 978 434 | 2/2000 |
| EP | 0 978 434 A | 2/2002 |

* cited by examiner

*Primary Examiner*—Thomas Williams
(74) *Attorney, Agent, or Firm*—Sughrue Mion, PLLC

(57) ABSTRACT

A pneumatic operating device for direct braking and an electropneumatic valve unit of an anti-slip device have their outlets connected to the braking actuators through an interlock valve device which can selectively allow the greater of the pressures received from the said devices to pass towards the braking actuators. The electrical operating device for the direct braking is also connected to an electrical interlock device associated with the electrical valve unit of the anti-slip device. When the electrical operating device for the direct braking is operated, the electrical interlock device disables the electrical anti-slip valve unit and makes this unit open with respect to the braking pressure sent towards the braking actuators.

5 Claims, 3 Drawing Sheets

BRAKING SYSTEM FOR A SELF-POWERED RAIL VEHICLE PROVIDED WITH AN ANTI-SLIP DEVICE

DESCRIPTION

The present invention relates to a braking system for a self-powered rail vehicle provided with a device for preventing or at least opposing the slipping of the wheels on the rails.

More specifically, the invention relates to a pneumatic braking system for a self-powered rail vehicle having a plurality of bogies, the system comprising:
- a pneumatic line, called the general line, for operating the braking of the self-powered vehicle itself and of any train towed thereby,
- a plurality of pneumatically operated braking actuators,
- a brake package connected between the said pneumatic line and the braking actuator devices,
- an automatic braking operating device, which can be operated manually to cause a controlled reduction of pressure in the said line and to cause a corresponding braking of the self-powered vehicle and of any other vehicles coupled thereto,
- a pneumatic operating device and/or an electrical operating device for the direct braking, which can be operated manually to cause the direct braking of the self-powered vehicle only; the electrical operating device being connected by an electrical line to an associated electropneumatic valve operating device for the direct braking, and
- an anti-slip device, including at least one electropneumatic valve operating unit, interposed between the brake package and the braking actuators of a bogie for controlling the pressure applied to these braking actuators, and an associated electronic control unit.

Figure 1:
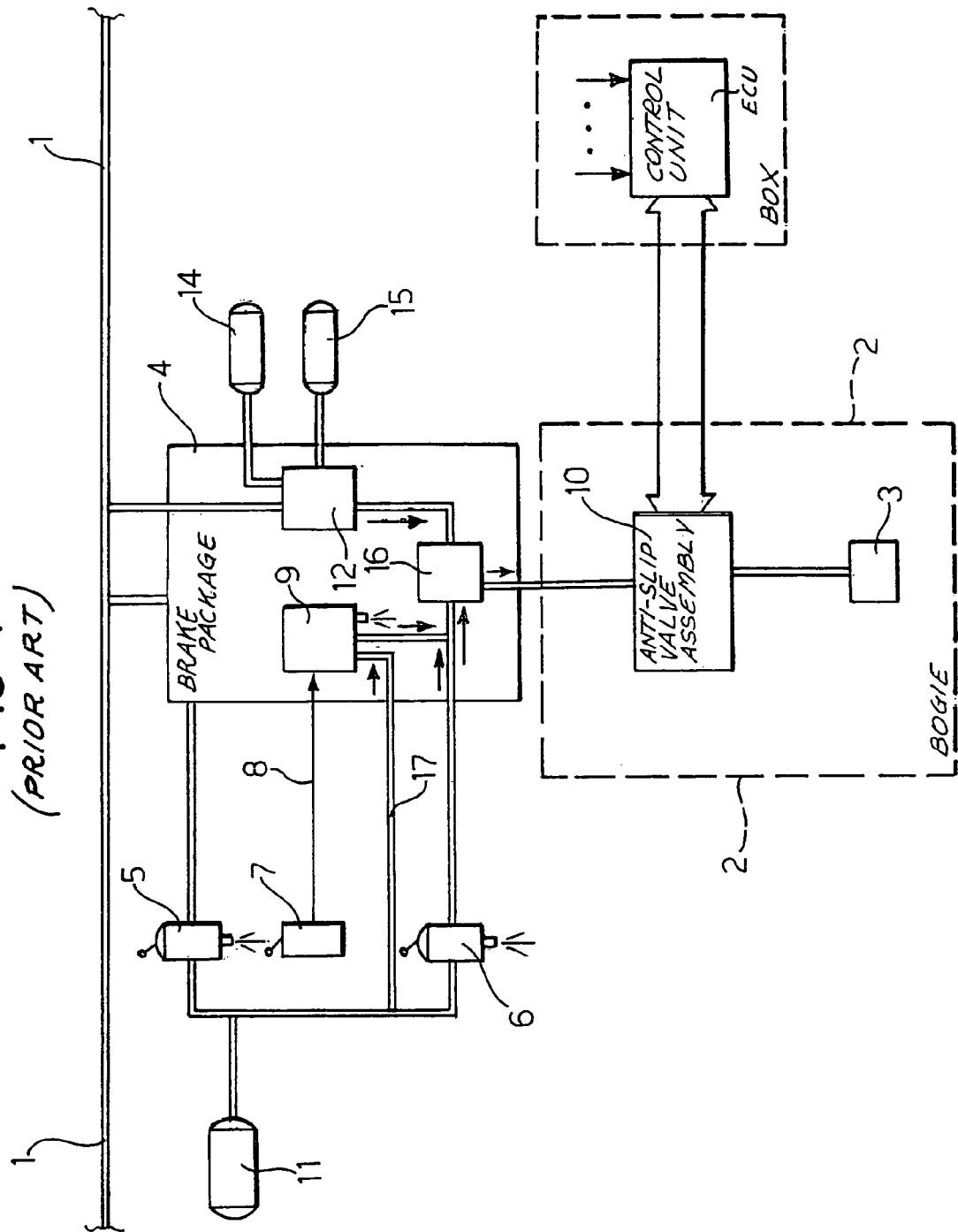

A braking system of this type, produced according to the prior art, is illustrated schematically and partially in FIG. 1 of the attached drawings. In this figure, the number 1 indicates the general pneumatic braking operating line which extends along the self-powered rail vehicle, and the number 2 indicates the whole of a bogie of this vehicle, whose wheels are associated with pneumatically operated braking actuators, of a known type, represented schematically by a block indicated by the number 3.

The braking system of FIG. 1 also comprises what is known as a brake panel or package, indicated by 4, connected between the general line 1 and the braking actuators 3. In a known way, the brake package 4 comprises a pneumatic distributor 12 associated with an auxiliary pressure reservoir 14 and a control pressure reservoir 15, interlock (or blending) valves, one or more relay valves for interfacing with the braking actuators, etc.

In other known braking systems which are not illustrated, a plurality of brake packages may be provided, including one or more distributors, each of these packages being associated with a corresponding bogie or group of bogies.

The brake package 4 is connected to a self-adjusting pneumatic valve 5 for operating the automatic braking, which can be operated manually to cause a controlled reduction of pressure in the line 1, and to cause a corresponding automatic operation of the distributor 12 and the braking of the self-powered vehicle, and of any other vehicles coupled to it, which are not shown.

The braking system of FIG. 1 also comprises a pneumatic operating device 6 and an electrical operating device 7 for controlling what is known as the direct braking of the self-powered vehicle only. These devices can provide modulated operation of the direct braking.

The electrical operating device 7 for the direct braking is connected by an electrical line 8 to an associated electropneumatic valve device 9 located in the brake package 4 and connected to the main pressure reservoir 11 by a pipe 17 and to an inlet of a selector valve unit 16, which has another inlet connected to the outlet of the pneumatic distributor 12.

The braking system of FIG. 1 also comprises an anti-slip device, including an electropneumatic valve operating unit 10, interposed between the outlet of the selector valve unit 16 of the brake package 4 and the braking actuators 3 of a bogie 2, for controlling the pressure applied to these braking actuators. The valve unit 10 is controlled in a known way by a conveniently allocated electronic unit ECU. In operation, this unit ECU receives signals from sensors of known types, for example vehicle wheel velocity sensors, etc.

The anti-slip valve unit 10, acting under the control of the unit ECU, can block the rise of pressure or, when necessary, discharge the pressure applied to the braking actuators 3, according to known criteria, in such a way as to prevent the slipping of the vehicle.

In a braking system for a self-powered vehicle of the type described above, any breakdown or fault of the control unit ECU of the anti-slip device which can cause the operation of the associated valve unit 10 at the incorrect time, thus blocking the pressure increase or, worse still, completely discharging the braking pressure, creates a situation in which the braking action is unavailable. This phenomenon is particularly serious in the case of a self-powered vehicle with two or more bogies, in which there may be a total loss of braking action.

With other braking systems for rail vehicles, such as the system described in U.S. Pat. No. 6,250,723 in the name of the present applicant, the problem outlined above may still occur, although with reduced disadvantages, since the unit which provides the general and total control of the braking, including the anti-slip function, is produced in the form of a compact unit located in each bogie. It is therefore fairly unlikely that a simultaneous hardware failure could occur in both of the control units associated with the two bogies of a self-powered vehicle. In respect of the software, by definition what is known as a "common failure", which can give rise to a loss of braking in the whole vehicle or train, is theoretically possible, although rather rare and unlikely to occur.

Duplication of the control units of the anti-slip electrical valve control unit to provide redundancy cannot ensure complete safety, unless these units are provided with completely different software from each other, to avoid the aforementioned risk of common failure.

One object of the present invention is to provide a braking system for a self-powered rail vehicle of the type specified above, which can overcome the drawbacks and problems mentioned above in relation to the prior art systems.

This and other objects are achieved according to the invention with a braking system of the type described above, characterized in that:
- the pneumatic operating device for the direct braking and the electropneumatic valve unit of the anti-slip device have their outlets connected to the braking actuators through an interlock valve device which can selectively allow the greater of the pressures received from the said devices to pass towards the actuators, and in that
- the electrical operating device for the direct braking is also connected to an electrical interlock device associated with the electrical valve unit of the anti-slip device, the arrangement being such that, when the said electrical operating device for the direct braking is operated, the electrical interlock device disables the anti-slip electrical valve unit and makes it open or transparent with respect to the braking pressure sent to the braking actuators.

In one embodiment, the electropneumatic valve operating unit for the direct braking is located outside the brake package, and is physically positioned directly in contact with the electrical valve unit of the anti-slip device, and is electrically interlocked with this device.

The aforementioned interlock valve device can consist of a double cut-off valve or what is known as a selector.

The valve operating device for the direct braking and the electropneumatic valve unit of the anti-slip device can conveniently both be positioned near or directly on the bogies of the self-powered vehicle.

Figure 2:
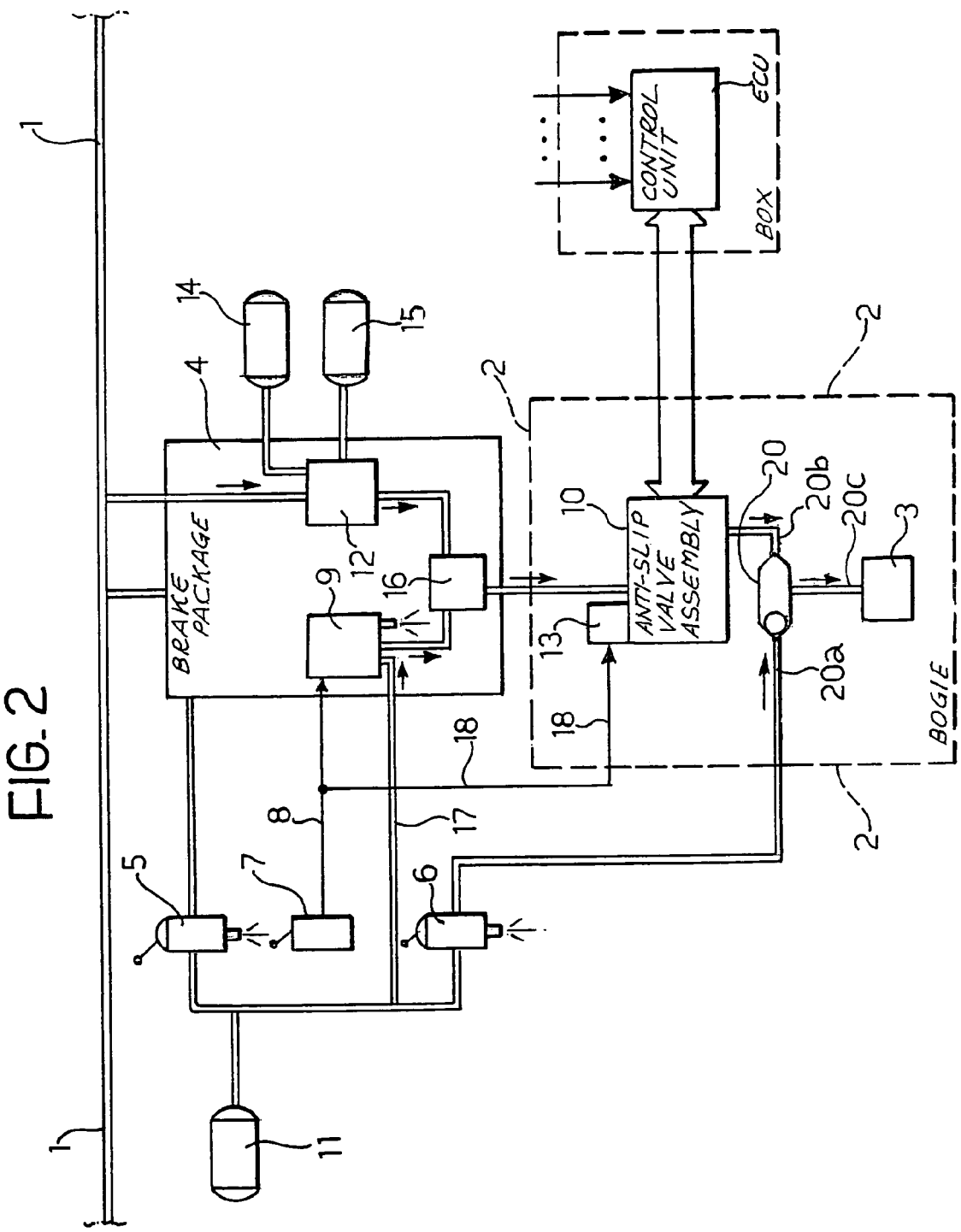
Figure 3:
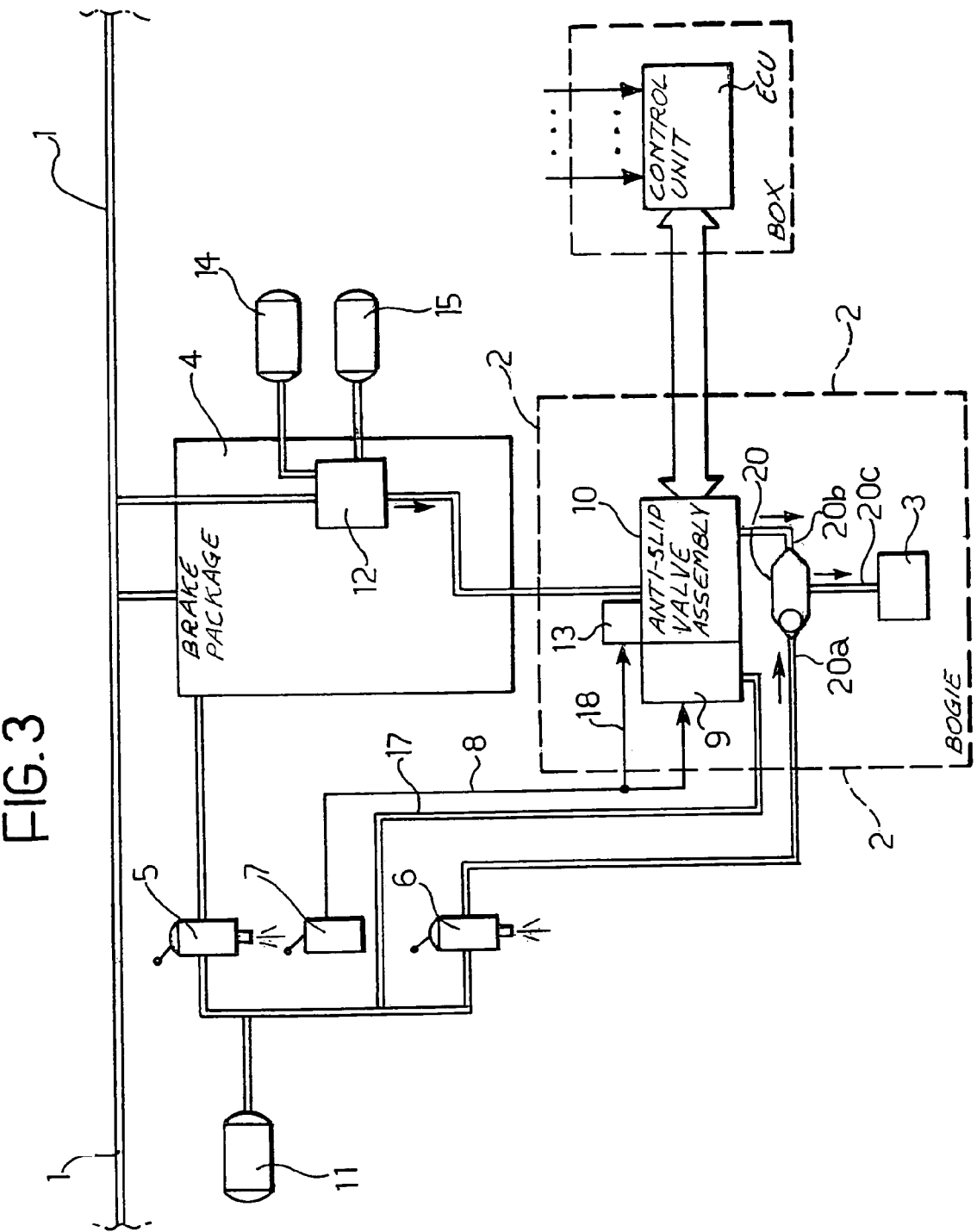

Further characteristics and advantages of the invention will be made clear by the following detailed description, provided purely by way of example and without restrictive intent, with reference to the attached drawings, in which:

FIG. 1, described above, is a partial block diagram of a braking system for a self-powered rail vehicle according to the prior art, FIG. 2 is a partial representation, in the form of a block diagram, of a braking system according to the present invention, and FIG. 3 is a diagram of a variant embodiment of a system according to the invention.

In FIG. 2, parts and elements identical or substantially equivalent to components described previously have been given the same alphabetic or numerical reference symbols.

In the braking system for a self-powered rail vehicle according to the invention, as illustrated in FIG. 2, the outlet of the modulatable self-adjusting operating valve 6 for the direct braking of the self-powered vehicle only is disconnected from the brake package 4, being connected instead to a first inlet 20a of an interlock valve device indicated as a whole by 20. This valve device 20 has a second inlet 20b, connected to the outlet of the electropneumatic valve unit 10 of the anti-slip device.

The interlock valve device 20, which can if necessary be incorporated in the anti-slip valve unit 10, has its outlet 20c connected to the braking actuators 3.

In the embodiment illustrated by way of example, the interlock valve device 20 is a double cut-off valve.

In a variant embodiment, not shown in the drawings, the interlock valve device comprises a network valve with two independent control sections.

The arrangement is such that the interlock valve device 20 can selectively allow the passage towards the braking actuators 3 of the greater of the pressure received from the modulatable direct braking operating valve 6 and the pressure received from the electropneumatic anti-slip valve 10. Consequently, in case of a failure in the control unit ECU or a fault in the electropneumatic anti-slip valve unit 10 such as to cause a discharge to the atmosphere of the pressure intended to operate the braking actuators 3, these actuators can still receive a braking pressure from the modulatable direct braking operating valve 6.

If the self-powered vehicle has the electrical direct braking operating device 7 in addition to the pneumatic direct braking operating valve 6, or as an alternative to it, then the associated electropneumatic direct braking valve device 9 for operating the direct braking can conveniently be either inside or outside the brake package 4, as shown in FIG. 2 and FIG. 3 respectively. In both of the embodiments shown in these figures, the output of the electrical direct braking operating device 7 is also connected through a line 18 to an operating input of an electrical interlock device 13 associated with the electrical anti-slip valve unit 10. The device 13 is activated when the device 7 is operated, and makes the unit 10 open, in other words "transparent", to the direct braking pressure sent towards the braking elements 3.

In the embodiment shown in FIG. 3, the electrical valve device 9 is physically positioned directly adjacent to the anti-slip valve unit 10.

It is also possible for the embodiment shown in FIG. 3 to be constructed without the selector valve unit 16 shown in the preceding figures.

Clearly, provided that the principle of the invention is retained, the forms of application and the details of construction can be varied widely from what has been described and illustrated purely by way of example and without restrictive intent, without thereby departing from the scope of protection of the invention as defined by the attached claims.

What is claimed is:

1. Braking system for a self-powered rail vehicle provided with a plurality of bogies, the system comprising:
   a pneumatic line, called the general line, for operating the braking,
   a plurality of pneumatically operated braking actuators,
   a brake package or panel connected between the said pneumatic line and the braking actuator devices,
   an automatic braking operating device, which can be operated manually to cause a controlled reduction of pressure in the said line and to cause a corresponding braking of the self-powered vehicle and of any other vehicles coupled thereto,
   a pneumatic operating device and/or an electrical operating device for the direct braking, which can be operated manually to cause the direct braking of the self-powered vehicle only: the electrical operating device being connected by an electrical line to an associated electropneumatic valve device for operating the direct braking, and
   an anti-slip device, including at least one electropneumatic valve operating unit. interposed between the brake package and the braking actuators of a bogie for controlling the pressure applied to this braking actuator, and an associated electronic control unit:
   the pneumatic operating device for the direct braking and the electropneumatic valve unit of the anti-slip device having their outlets connected to the braking actuators through an interlock valve device which is adapted to selectively allow the greater of the pressures received from the pneumatic operating device for the direct braking and the electropneumatic unit of the anti-slip device to pass towards the braking actuators: and
   the electrical operating device for the direct braking being also connected to an electrical interlock device associated with the electropneumatic valve unit of the anti-slip device, the arrangement being such that, when the said electrical operating device for the direct braking is operated, the electrical interlock device disables the electrical anti-slip valve unit and makes it open with respect to the braking pressure sent to the braking actuators.

2. Braking system according to claim 1, in which the aforesaid electropneumatic valve device for operating the direct braking is external to the brake package and is physically positioned directly adjacent to the electrical valve unit of the anti-slip device.

3. Braking system according to claim 1, in which the aforesaid interlock valve device comprises a double cut-off valve.

4. Braking system according to claim 1, in which the aforesaid interlock valve device comprises a relay valve with two independent control sections.

5. Braking system according to claim 2, in which the valve device for operating the direct braking and the valve unit of the anti-slip device are both positioned next to or directly on a bogie of the self-powered vehicle.

* * * * *